UNITED STATES PATENT OFFICE.

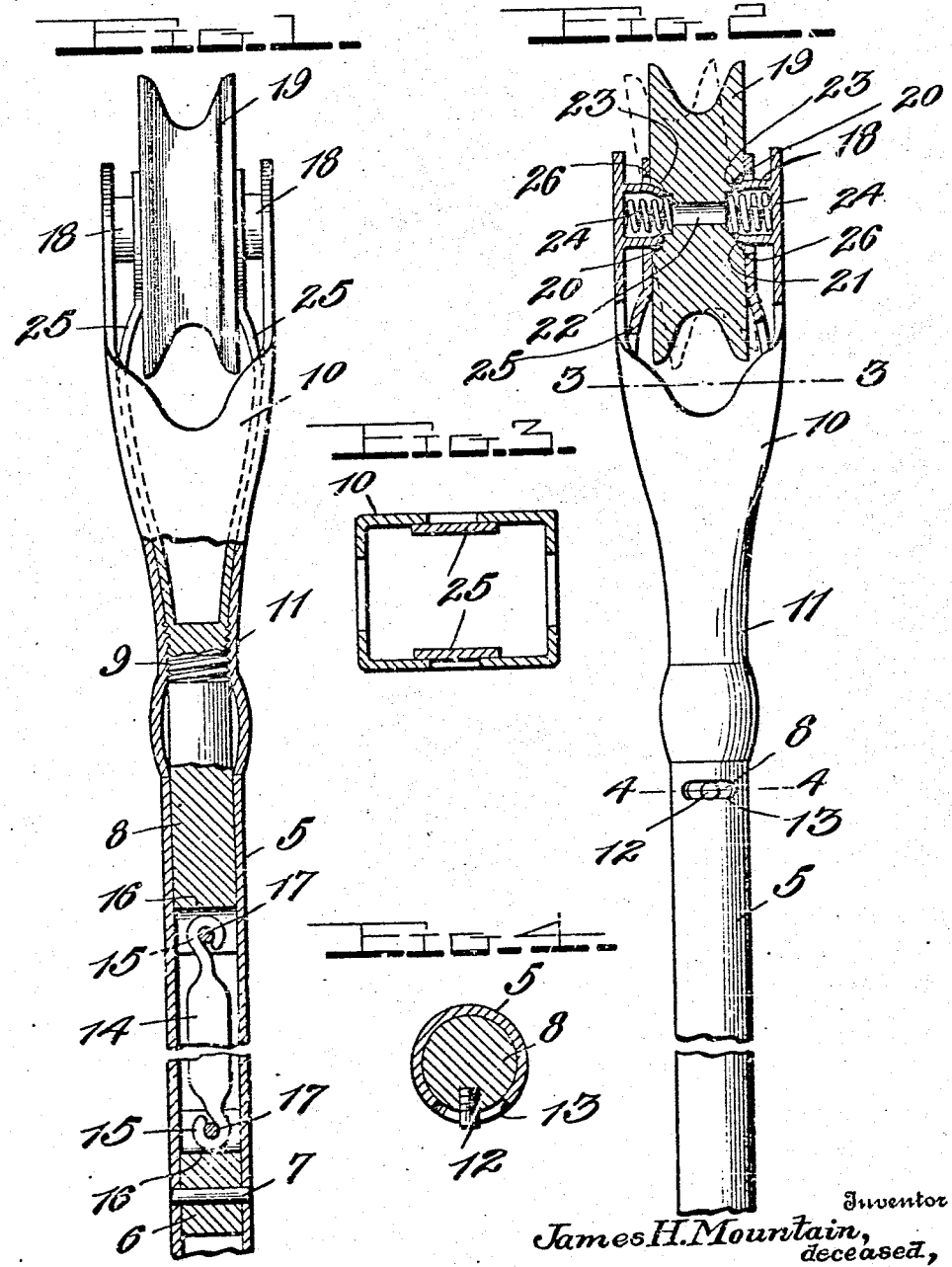

JAMES H. MOUNTAIN, DECEASED, LATE OF TERRE HAUTE, INDIANA, BY LAURA MOUNTAIN, ADMINISTRATRIX, OF TERRE HAUTE, INDIANA.

TROLLEY FOR ELECTRIC RAILWAYS.

997,576. Specification of Letters Patent. Patented July 11, 1911.

Application filed March 31, 1911. Serial No. 618,104.

*To all whom it may concern:*

Be it known that JAMES H. MOUNTAIN, deceased, late a citizen of the United States, residing at Terre Haute, in the county of Vigo and State of Indiana, invented certain new and useful Improvements in Trolleys for Electric Railways, of which the following is a specification, reference being had to the accompanying drawings.

This invention relates to improvements in trolleys for electrical railways and has for its primary object to provide a device of comparatively simple construction for maintaining the trolley wheel in contact with the conducting wire, when the car upon which the trolley is applied moves upon a curved section of the track, and under all other conditions which necessitate the angular disposition of the trolley wheel with relation to its axis or to the conducting wire.

A further object of the invention resides in the provision of very simple and efficient means for securing a continuous electrical connection between the frame of a harp in which the wheel is mounted and the trolley pole.

With the above and other objects in view, the invention consists of the novel features of construction, combination and arrangement of parts hereinafter fully described and claimed, and illustrated in the accompanying drawings, in which—

Figure 1 is an elevation of a trolley pole and wheel mounted therein embodying the improvements, the pole being shown in section; Fig. 2 is a longitudinal section; Fig. 3 is a section taken on the line 3—3 of Fig. 2; and Fig. 4 is a section taken on the line 4—4 of Fig. 2.

Referring in detail to the drawing 5 designates the ordinary tubular trolley pole which is adapted to receive a cylindrical core member 6 which is disposed in said tube some distance below the upper open end thereof and is securely fixed in the same by means of a rivet 7. A second cylindrical member 8 is arranged in the tubular trolley pole and projects beyond the upper open end thereof. This projecting portion of the member 8 is provided with the screw threads 9 to receive the interiorly threaded tubular portion 11 of the wheel frame or harp 10. The end of this tubular portion of the harp engages the end of the tubular pole when the parts are properly assembled. The member 8 has threaded or otherwise fixed therein a stud 12 which projects through a short circumferential slot 13 in the pole 5. The member 8 is adapted to turn or rotate within the tubular pole, and such turning movement is limited by the stud 12 engaging the opposite end of the slot 13 as will more fully appear from the following description.

The cylindrical members 6 and 8 are connected by means of a flat spring 14, upon each end of which an eye 15 is formed for engagement in a socket or recess 16 in the opposed ends of the members 6 and 8. Pins 17 extend transversely through the ends of said members and through said eyes. This flat metal spring 14 normally acts to hold the upper cylindrical member 8 against rotation in the end of the trolley pole, in which position the projecting end of the stud 12 is centrally disposed in the slot 13 as shown in Fig. 2.

The opposed upper ends of the harp 10 have formed thereon the inwardly extending tubular bosses 18 upon which the trolley wheel 19 is rotatably mounted. The opposed ends of the bosses 18 are rounded or convex in form as indicated at 20. The wheel 19 is centrally provided with an opening, the ends 21 which open upon the opposite faces thereof, receiving the tubular bosses 18. The central portion of the opening in the trolley wheel is considerably reduced in diameter in comparison with the end portions thereof as shown at 22. The inner ends of the portions 21 of the axial opening in the trolley wheel have their walls curved as shown at 23 for contact with the rounded or convex ends 20 of the cylindrical bosses 18. Within the bosses 18 the coiled springs 24 are arranged, said springs engaging the circumferential wall at the ends of the central contracted portion 22 of the opening in the wheel, and with the side arms of the trolley harp. These springs normally act to centrally position the wheel 19 between the opposed sides of the supporting harp or frame. Upon striking a bend in the conducting wire or a curve in the track thereby causing the wire to bear in the groove of the wheel upon one side of its center, the wheel will be moved to a plane wherein its axis of rotation will be disposed at an angle to the normal rotative axis of the wheel, as indicated in dotted lines in Fig. 2. When thus disposed one of the springs 24 will be placed under compression and when the wheel 19 passes the bend of the wire or the car moves upon a straight track, this spring expands and returns the wheel to its normal position.

In order to maintain the continuity of electric conduction, the spring arms 25 are provided which may be integrally formed with the rotatable cylindrical member 8 or separately constructed and secured thereto at one of their ends. These spring arms extend between the opposite sides of the trolley harp or frame and substantially one-half of their length are engaged therewith. The upper ends of these arms are, however, bowed inwardly and the extremities thereof movably disposed upon the tubular bosses 18 of the frame, the ends of said arms being provided with openings 26 to receive the same. The ends of these spring arms, it will be noted, are disposed in close contact with the opposite faces of the wheel 19 for a sufficient distance around the bosses 18 to insure the same remaining at all times in engagement therewith so that the electrical current will be properly conducted from said wheel to the trolley pole.

In the operation of the improved wheel, upon the same striking a bend in the wire, the harp and the wheel move bodily upon the end of the pole, the member 8 rotating in the same until the stud 12 engages the end of the slot 13. It will be obvious that in this movement the flat metal spring 14 will be twisted. By mounting the wheel 19 for independent movement in the harp, it at all times remains in firm engagement upon the conducting wire so that there will be no interruption whatever of the current. The parts are immediately returned to their normal positions when the pole is disposed in its usual position between the wire and the car upon which it is mounted.

It will be seen that by mounting the wheel in the manner specified, the use of the ordinary axle is entirely dispensed with, thus eliminating one of the items of greatest expense in the construction of such devices while at the same time the proper operation and a high degree of efficiency is obtained. In the ordinary form of trolley employing the usual axle on which the wheel is mounted, it is necessary to provide lubricating means, or the axle soon becomes greatly worn and must be frequently replaced. The device is also exceedingly durable and the various parts thereof may be easily and quickly assembled.

While there is shown and described the preferred construction and arrangement of the various parts, it will be understood that the invention is susceptible of considerable modification without departing from the essential feature or sacrificing any of the advantages thereof.

Having thus described the invention what is claimed is:—

1. In a trolley for electric railways, the combination with a tubular pole, of a cylindrical member rotatable in said pole and projecting beyond one end thereof, a trolley harp having a tubular portion for threaded engagement on the projecting end of said member, means normally holding said cylindrical member yieldingly against rotation, a wheel rotatably mounted in the harp, and flexible electrical conductors extending from the end of said cylindrical member and engaging with the opposite faces of said wheel.

2. In a trolley for electric railways, the combination with a tubular pole, of cylindrical members arranged in spaced relation within said pole, one of said members being rotatable therein and the other rigidly secured to the pole, a resilient metal bar connecting the opposed ends of said members, said trolley pole having a circumferential slot therein, a stud fixed to the rotatable member projecting through said slot to limit the rotation of said member, and a wheel carrying a harp removably secured to said rotatable member.

3. In a trolley for electric railways, the combination with a trolley pole, of a harp on one end of said pole, said harp comprising spaced plates, tubular bosses formed on the opposed faces of said plates, a trolley wheel arranged between said plates and having an axial opening, said bosses engaging in the opposite ends of said opening, springs arranged in said bosses and engaging the wheel to maintain the same normally in a rotative plane parallel to the spaced plates of the harp, and flexible electrical conductors carried by the pole and extending between said spaced plates, the ends of said conductors being movable upon said tubular bosses and engaged with the faces of the wheel.

4. In a trolley for electric railways, the combination with a pole, of a harp arranged on the end of said pole, said harp comprising spaced plates having tubular bosses formed upon their opposed faces, a trolley wheel arranged between said plates provided with an axial opening diametrically enlarged at its ends to receive said tubular bosses, a coiled spring arranged in each of said bosses engaging the harp plates and the wheel at the opposite ends of the central contracted portion of the axial opening of the same to yieldingly maintain said wheel in a rotative plane parallel to the harp-plates and centrally between the same, and flexible electrical conductors extending from the trolley pole movable on said bosses and closely engaging the opposite faces of the wheel.

In testimony whereof I hereunto affix my signature in the presence of two witnesses.

LAURA MOUNTAIN,
*Administratrix of the estate of James H. Mountain, deceased.*

Witnesses:
MARGARET CREAL,
EDWARD H. CREAL.